(12) United States Patent
Caspersen

(10) Patent No.: US 9,254,988 B1
(45) Date of Patent: Feb. 9, 2016

(54) HITCH PULL AND LIFT ASSEMBLY AND METHOD

(71) Applicant: William Caspersen, Eau Claire, WI (US)

(72) Inventor: William Caspersen, Eau Claire, WI (US)

(*) Notice: Subject to any disclaimer, the term of this patent is extended or adjusted under 35 U.S.C. 154(b) by 233 days.

(21) Appl. No.: 13/799,392

(22) Filed: Mar. 13, 2013

Related U.S. Application Data

(60) Provisional application No. 61/720,799, filed on Oct. 31, 2012.

(51) Int. Cl.
*B60P 9/00* (2006.01)
*B66C 23/46* (2006.01)

(52) U.S. Cl.
CPC ....................... *B66C 23/46* (2013.01)

(58) Field of Classification Search
CPC ......... E04H 12/345; E04H 12/34; B60R 9/06; B60P 3/40; B60P 3/1066; B60P 3/1058; B60P 9/00; B66C 23/46
USPC .................................. 414/462, 23
See application file for complete search history.

(56) References Cited

U.S. PATENT DOCUMENTS

| | | | | |
|---|---|---|---|---|
| 2,249,907 A * | 7/1941 | Perkowski | ..................... | 254/335 |
| 3,576,267 A * | 4/1971 | Blevins | ................... | B60P 1/483 |
| | | | | 414/563 |
| 3,656,639 A * | 4/1972 | Lothen | ........................... | 414/529 |
| 3,843,093 A * | 10/1974 | Thompson | .............. | B66C 23/48 |
| | | | | 254/325 |
| 3,915,320 A * | 10/1975 | Curtis | ..................... | B60P 3/125 |
| | | | | 414/563 |
| 5,281,078 A * | 1/1994 | Mills, Jr. | ................. | B66C 23/44 |
| | | | | 212/180 |
| 5,540,540 A * | 7/1996 | Peterson | ................. | B60P 3/127 |
| | | | | 280/402 |
| 5,615,813 A * | 4/1997 | Ouellette | ...................... | 224/405 |
| 5,752,636 A * | 5/1998 | Manley | ......................... | 224/405 |
| 5,794,387 A * | 8/1998 | Crookham | .................... | 52/122.1 |
| 6,089,431 A * | 7/2000 | Heyworth | ...................... | 224/521 |
| 2004/0234367 A1* | 11/2004 | Pacini | ........................... | 414/543 |
| 2011/0274526 A1* | 11/2011 | Kusick | ........................... | 414/457 |

* cited by examiner

*Primary Examiner* — Saul Rodriguez
*Assistant Examiner* — Lynn Schwenning
(74) *Attorney, Agent, or Firm* — Anthony J. Bourget

(57) ABSTRACT

A lift and pull assembly and method of removal of a dock or boat lift including a hitch receiver component configured to insert within a standard hitch receiver of a vehicle, a drawbar component configured to connect to the dock and having a lift foot mechanism that hinges upon the drawbar, a lift component having a lift arm extending from a mast where a cable from a winch extends from the lift arm to the lift foot mechanism such that operation of the winch moves the cable in order to apply a lifting force upon the dock or in order to simultaneously apply a lifting force and a pulling force upon the dock.

19 Claims, 7 Drawing Sheets

HITCH PULL AND LIFT ASSEMBLY AND METHOD

RELATED APPLICATIONS

This application claims the benefit and priority of Provisional Patent Application Ser. No. 61/720,799 filed Oct. 31, 2012, for HITCH PULL AND LIFT ASSEMBLY AND METHOD under 35 U.S.C. §119(e), incorporated herein by reference.

BACKGROUND

Field of the Invention and Background Information

The present invention relates generally to hitches and hoists and methods for use of the devices. The present invention is particularly directed towards a hitch assembly for use with a trailer hitch receiver of a truck or similar vehicle.

Removal of water docks and boat lifts can be a challenging task, often requiring several people to assist in lifting and moving the docks or lifts. Sometimes use of a winch connected to the back end of a pickup truck is used to assist in removal of the dock or lift. Even with use of a winch there are complications and difficulties in removal of the docks and lifts.

There is a need in the art for a simple and effective mechanism to assist in removal of a dock or lift.

PARTIAL SUMMARY OF THE INVENTION

The present invention provides an assembly that inserts into a standard trailer hitch receiver tube. The assembly includes a hitch pull and lift mechanism and is configured to connect to a dock or boat lift. The assembly allows for simultaneous pulling and lifting of a proximal end of a dock, for example.

The above partial summary is not intended to describe each illustrated embodiment, aspect, or every implementation of the present invention. The figures and detailed description that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which.

FURTHER DETAILED DESCRIPTIONS

A specific embodiment illustrated is not intended to be exhaustive or to limit the invention to the precise form disclosed. It is chosen and described in order to explain the principles of the invention and its application and practical use, and thereby enable others skilled in the art to utilize the same.

Figure 1:
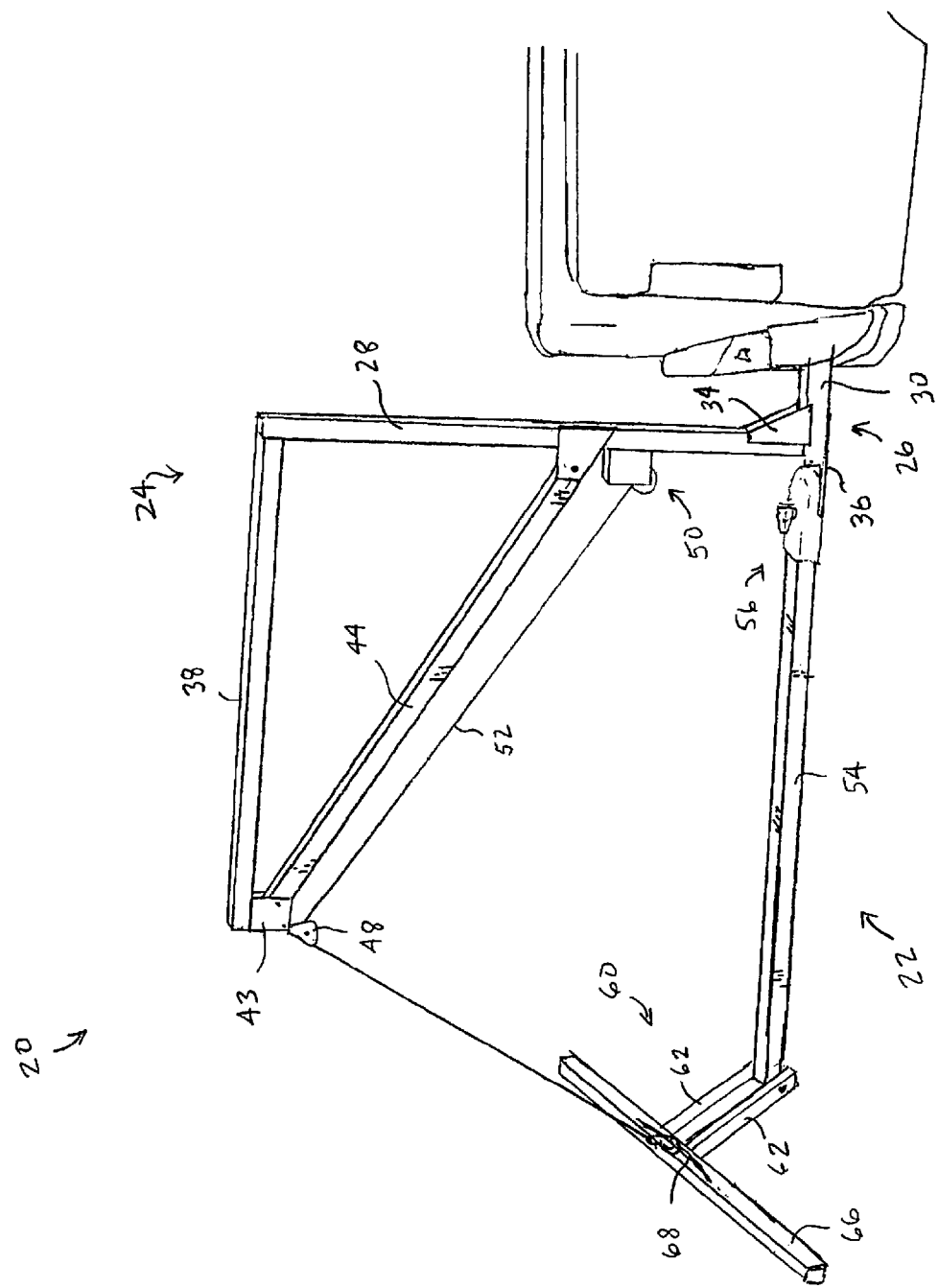
FIG. 1 is a perspective view of a hitch pull and lift assembly according to one aspect of the invention and connected to a receiver tube of a vehicle.
Figure 3:
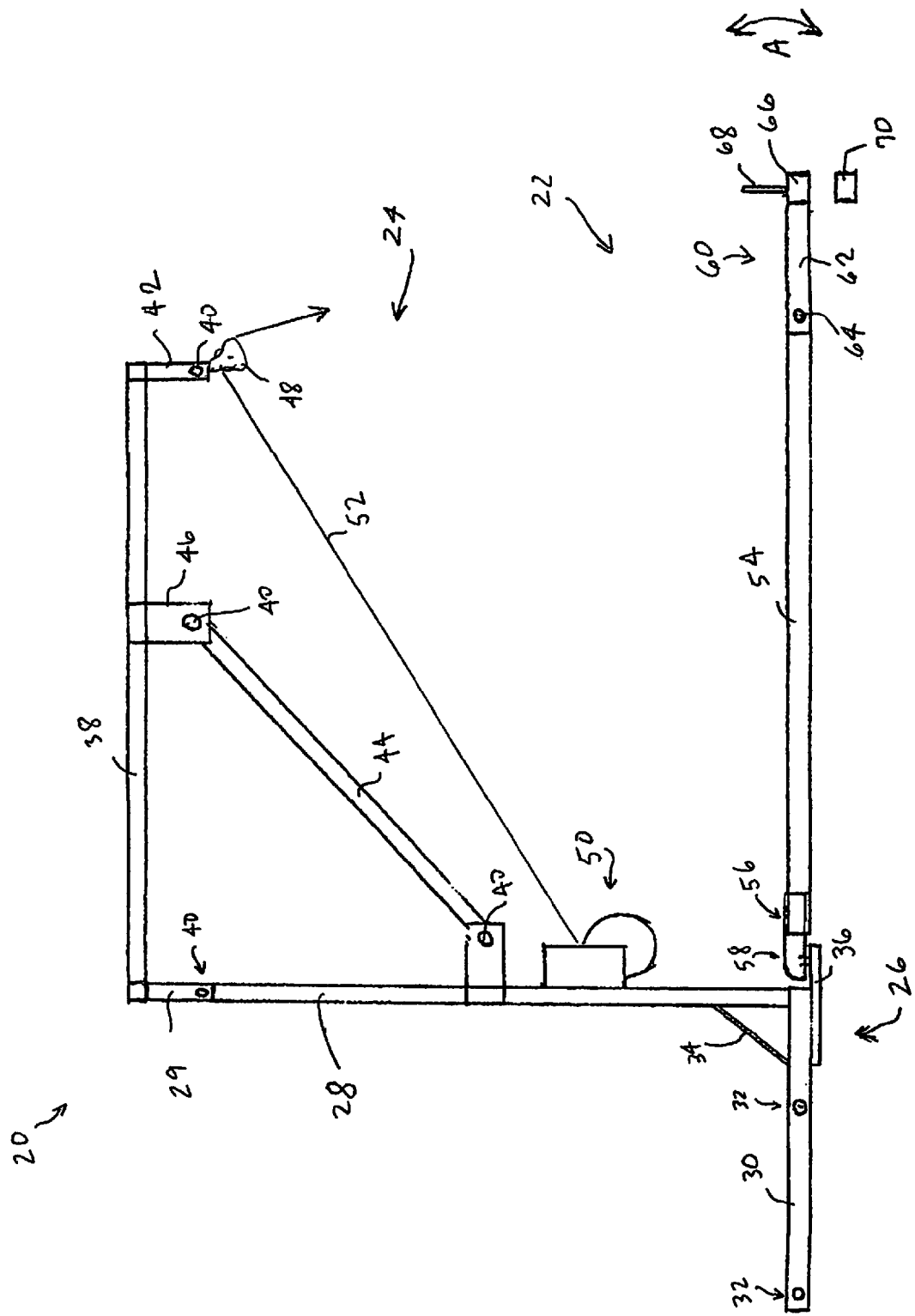
FIG. 3 is a side view of features of an alternative device assembly of FIG. 1.

Referring to the Figures, one aspect disclosed herein, for example, is an assembly 20 having a drawbar component 22 and a lift component 24. Assembly 20 may further include a hitch receiver component 26. Hitch receiver component 26 includes a bar that inserts into a hitch receiver as commonly known. For example, a pickup truck will have a hitch receiver that secures a trailer hitch or other component therein. Hitch receiver component 26 may be a separate element or may be combined with lift component 24. In one example as shown in FIG. 3, lift component 24 includes a mast 28 which may be connected to a hitch receiver tube 30 of hitch receiver component 26. Tube 30 may insert within a receiver and secured with a pin inserted through aperture 32 (See FIG. 3). It may be appreciated that hitch receiver tube 30 can be of varying lengths. As shown in FIG. 1, receiver tube 30 is shorter than the receiver tube 30 shown in FIG. 3. Tube 30 may be of any desired length to extend outwardly from hitch receiver. In one example, gusset plate 34 connects tube 30 with mast 28. Tube 30 and mast 28 may be connected by welding, for example, or by other securing means. Hitch receiver component 26 may include receiver plate 36. Mast 28 may also be connected to receiver plate 36.

Figure 2:
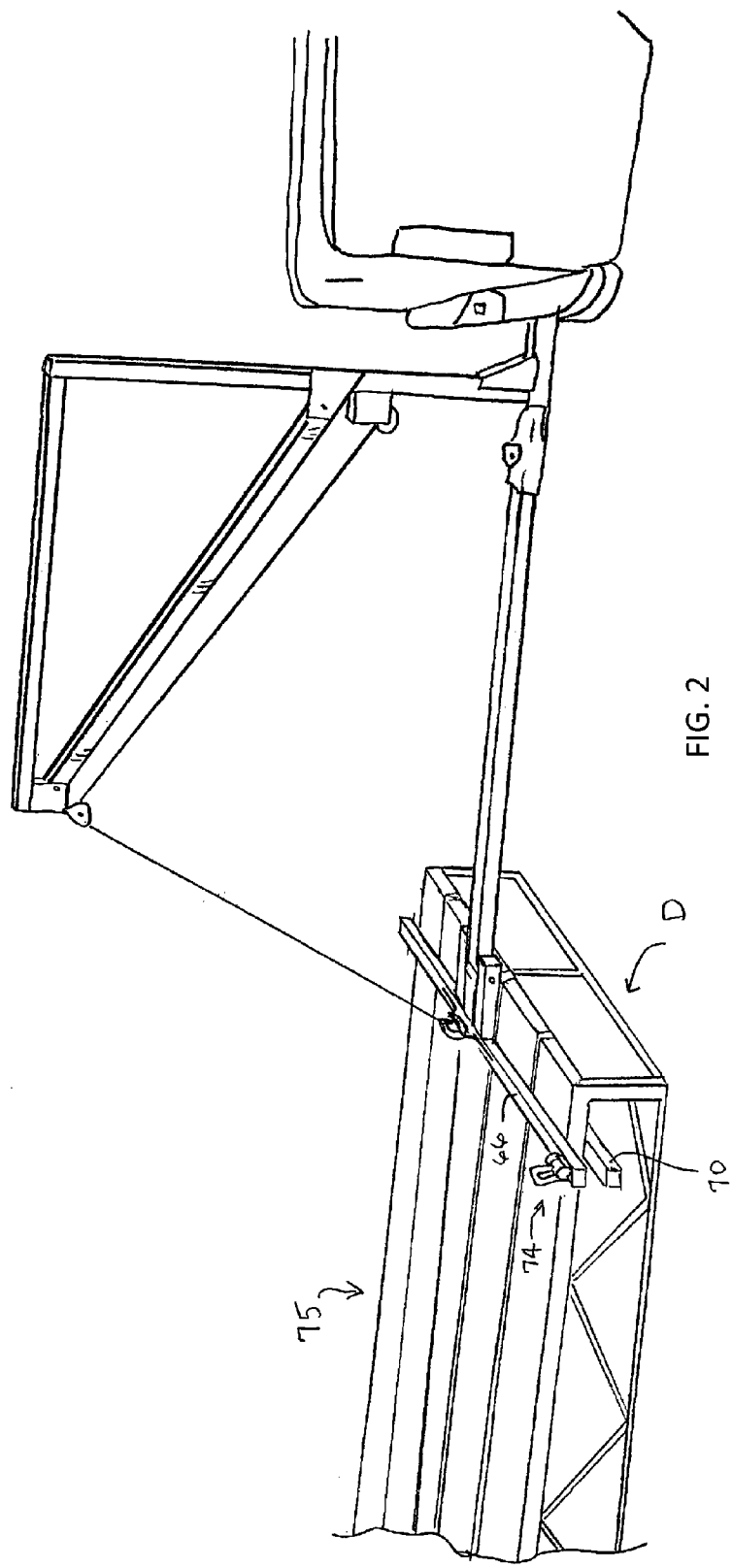
FIG. 2 is a perspective view of the assembly of FIG. 1 connected to a dock.

Mast 28 extends generally upwards from receiver component 26, and in one example extends vertically generally as shown in FIG. 3. A lift arm 38 extends from mast 28. In one example arm 38 extends generally perpendicularly from mast 28. Mast 28 may also have an extender portion 29 which inserts within mast 28 and allows for an increase in the length or extension of mast 28 as may be appreciated. In one instance, extender portion 29, for example, may be welded to lift arm 38. A pin 40 may insert into mast 28 to secure extender portion 29. Lift arm 38 includes in one example a pulley bar 42 positioned at a terminal end of arm 38. In an alternative arrangement as shown in FIG. 1 and FIG. 2 a pulley plate 43 may be positioned at a terminal end of arm 38. A pair of plates 43 may be positioned on either side of bar 38 for support. Pulley bar 42 (and pulley plate 43) extends generally downward and is configured to receive and hold a pulley 48 or other device to allow for a lifting action as described below. Pulley bar 42 may be generally U-shaped and may include a pin 40 to secure a pulley therein. Positioned between mast 28 and lift arm 38 is a strut bar 44. Strut bar 44 is configured to provide structural support so that mast 28 and lift arm 38 maintain a fixed or controlled relationship with respect to each other. In one alternative, strut bar 44 may include a cylinder to selectively alter the angle relationship between mast 28 and arm 38. In the example shown in FIG. 3, strut bar 44 is fixed into a position. Strut bar 44 may be secured with pins 40 as may be appreciated. Clamp bar or plate 46 may extend from arm 38 to accommodate holding of strut bar 44. Clamp bar 46 may be generally U-shaped and may include a pin 40 to receive and secure strut bar 44 therein. In one alternative example as shown in FIG. 1 and FIG. 2, strut bar 44 may extend from mast 28 to lift arm 38. Strut bar 44 may connect with pulley plate 43. It may be appreciated that strut bar 44, mast 28 and lift arm 38 may be welded together or alternatively pinned or detachably connected for ease of assembly, use and/or storage.

Lift component 24 includes a winch 50 connected thereto. Winch 50 may be a standard hand crank operated winch, for example. A cable 52 or rope or other type of line may be wound about winch 50 as is common. Cable 52 passes about pulley 48 where it may be secured to an object to be lifted and/or pulled. In one example, cable 52 is secured to drawbar component 22.

Drawbar component 22 includes a drawbar 54 which in one example includes a ball receiver 56. Ball receiver 56 is configured to engage a ball 58 which in one example is positioned on receiver plate 36. Ball 58 may be one of many typical balls used in common trailer hitch mechanisms. Draw bar 54 extends generally horizontally from hitch receiver component 26. Draw bar 54 may be of any desired length. In one example, a terminal end of draw bar 54 may extend a distance slightly greater than the length of lift arm 38. Draw bar 54 is configured to receive a lift foot 60.

Lift foot 60 is positioned at a terminal end of draw bar 54. In one example lift foot 60 includes brace bars 62 which straddle bar 54. A bolt 64, such as a ½ inch bolt is positioned between brace bars 62 to secure bar 54. Bolt 64 allows for lift foot 60 to swivel upwards or downwards as may be appreciated. As shown in FIG. 1, lift foot 60 is swiveled in an upward position. It may be appreciated that foot 60 may adjust either upward or downward as represented by Arrow A in FIG. 3.

Figure 4:
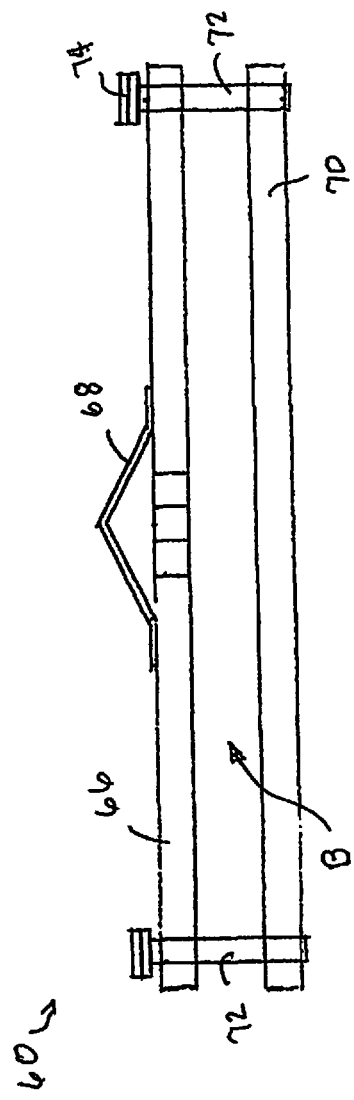
FIG. 4 is an end view of a drawbar feature of the assembly of FIG. 3.
Figure 5:
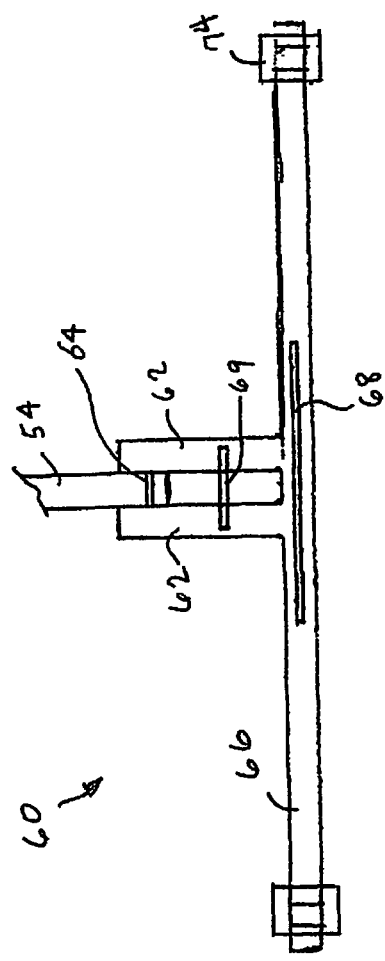
FIG. 5 is a top view of the drawbar feature of FIG. 4.
Figure 6:
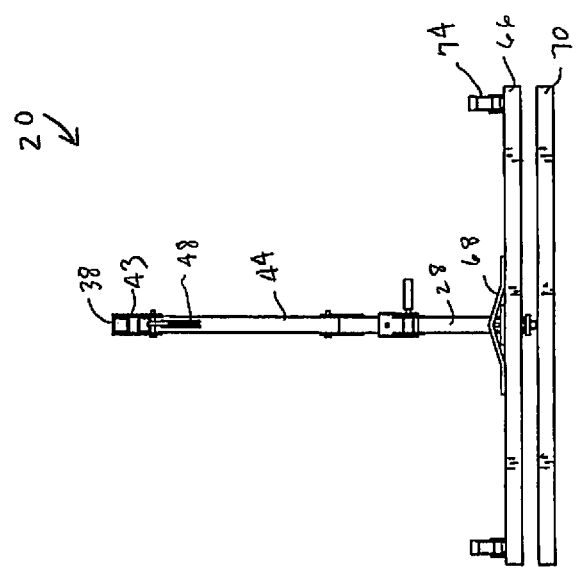
FIG. 6 is an elevational view of features of the assembly of FIG. 2.
Figure 8:
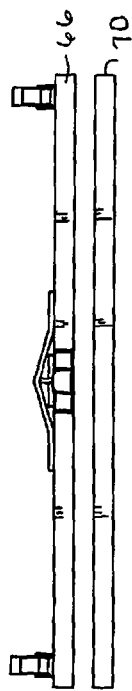
FIG. 8 is an end view of the drawbar feature of FIG. 7.
Figure 9:
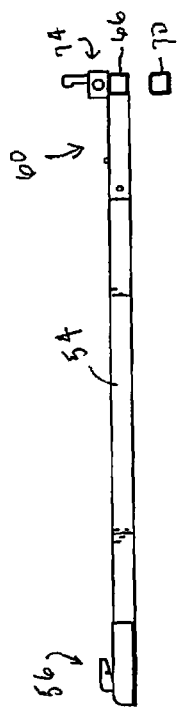
FIG. 9 is an elevational view of the drawbar feature of FIG. 7.
Figure 7:
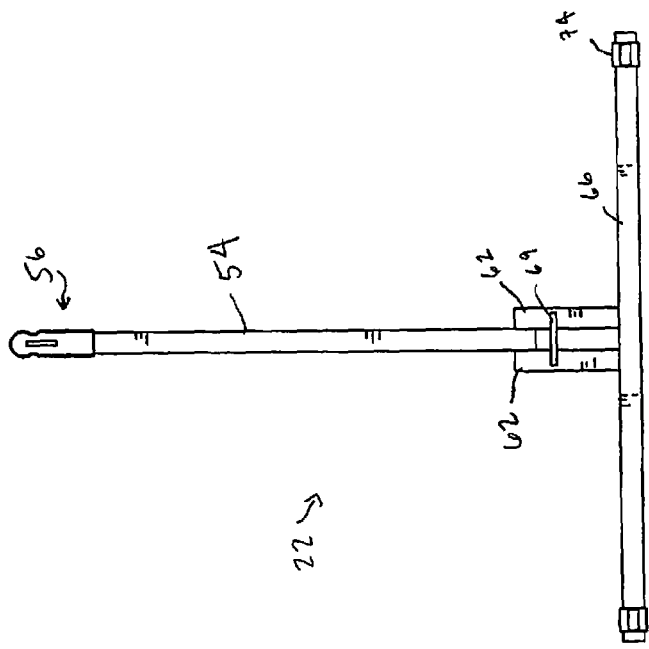
FIG. 7 is a top view of a drawbar feature of the assembly of FIG. 6.
Figure 10:
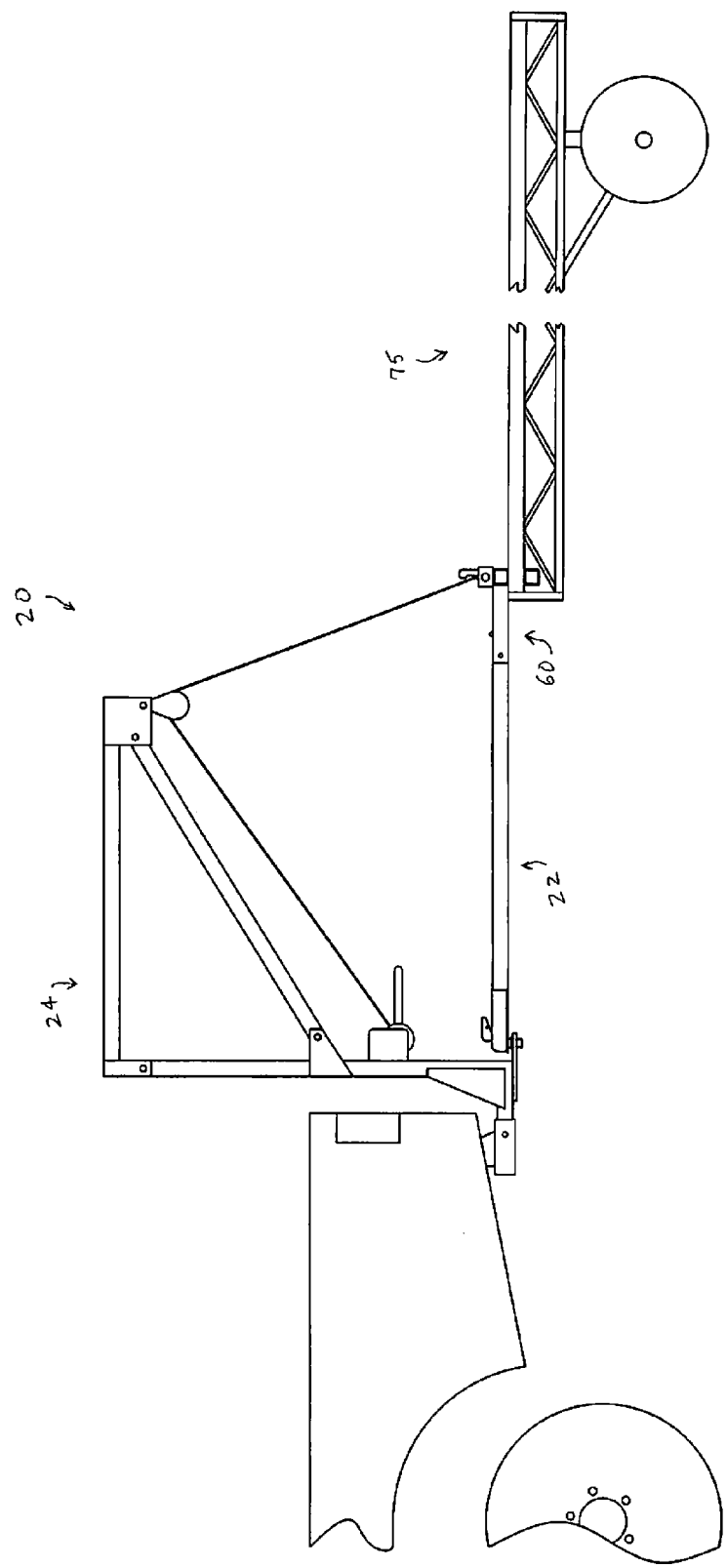
FIG. 10 is an elevation view of the assembly of FIG. 2.

Lift foot 60 includes lift bar 66. Lift bar 66 in one example is a rectangular cross-section bar and is connected to brace bars 62. Lift bar 66 in one example has a length that extends the width of a typical fishing dock D. In one example lift bar 66 extends a distance greater than the width of a typical fishing dock D. In one example lift bar has a length of 60 inches. In one example, lift foot 60 includes lift handle 68. Lift handle 68 may comprise in one example ½ inch rebar welded to bar 66. Handle 68 may elevate slightly as shown in FIG. 4 so that a hook, for instance, may connect to handle 68. In such manner a hook at the end of line 52 may be secured to handle 68. A reinforcement bar 69, for instance a rebar piece, may be included between brace bars 62 for additional stability as desired.

In one example the tube 30, mast 28, draw bar 54 and other components may be made of tubing such as rectangular hollow section tubing. Such tubing may also be square tubing. In one example such tubing may include 2 inch by 2 inch hollow tubing (3/16 inch wall thickness is one example). It may be appreciated that such components need not be limited to the tubing or dimensions as shown. The line or cable 52 may be a 3/16 inch cable by 40 foot in length, for instance, operable with a hand operated or other winch 50, for example.

A supplemental bar 70 may be used in conjunction with lift bar 66. For instance, while bar 66 may be positioned across a top portion of a dock D as shown in FIG. 2, bar 70 may be positioned underneath the top portion of the dock 75. In one instance bar 70 may be positioned opposite bar 66 in order to "sandwich" the dock so that a secure holding may be achieved. With reference to FIG. 4, a dock may be positioned in Space B. With such positioning lift bar 66 may be placed on a top portion of a dock, while supplemental bar 70 is positioned at an underside of the dock. Supplemental bar 70 may include a rectangular cross-section and have a length the same or similar to a length of lift bar 66. In one instance, a ratchet (or pair of ratchets such as 74) having a strap, such as a 2-inch nylon strap, may be used to secure lift bar 66 and supplemental bar 70 to a dock or other object to be pulled and/or lifted. Particularly, a strap 72 (See FIG. 4) may be wrapped about bar 66 and bar 70. Strap 72 may be tightened to provide a secure hold of dock in space B. It may be appreciated that a pair of ratchets 74 may be utilized, one at each end of bar 66. A ratchet 74 may be fastened to bar 66 as desired (including by welding) or may simply be friction fit when a strap is used to secure bar 70. In a further aspect a bolt may be secured between bar 66 and bar 70 to hold dock in space B. For instance, a hole may be placed in bar 66 and in bar 70 and a bolt may be positioned between the bars and secured so that bars 66, 70 "sandwich" a dock or other object to be pulled.

A variety of dimensions and alternative dimensions of the components of assembly 20 may be used. In one example, draw bar 54 may be about 48 inches in length where ball receiver 56 adds additional length so that bar 54 extends from mast 28 a greater distance that what lift arm 38 extends from mast 28. In one example lift arm 38 may extend 48 inches. In one example mast 28 is 48 inches. The foregoing are alternative arrangements and non-exclusive examples of various components and dimensions of components for use in conjunction with various aspects of the invention. It may be appreciated in one instance that hitch receiver tube 30 may be of shorter length as compared between the features shown in FIG. 1 and FIG. 3.

In operation, assembly 20 may be used to remove a dock or a boat lift. In one instance, assembly 20 may be connected to a receiver hitch of a vehicle by inserting hitch receiver tube 30 therein. Once tube 30 is inserted, in one instance lift component 24 will be in position as generally shown in FIG. 1. Thereafter drawbar component 22 may be connected to ball 58 and configured to extend rearwardly of the vehicle as generally shown in FIG. 1. Since drawbar component 22 is secured to ball 58, bar 54 may be adjusted in many different angles or directions to accommodate a variety of configurations and terrain. Assembly 20 may then be positioned adjacent a dock 75 as shown in FIG. 2. Such positioning may be accomplished, in one example, by backing the vehicle to a position adjacent dock 75. Lift bar 66 may be lowered to abut dock 75 by releasing winch 50 as is commonly understood. An optional supplemental bar 70 may be positioned about dock 75 and secured in one instance with straps 72 via ratchet 74. Once assembly 20 is secured to dock 75, winch 50 may be wound so as to provide an uplifting force to the dock 75, while providing a simultaneous pulling force in the direction of travel of the vehicle. Terminal end of lift arm 38 is positioned slightly rearward of terminal end of draw bar 54 to accommodate for the above-mentioned pulling force. Such simultaneous action assists in removal or extraction of a dock from a lake or riverbed.

With reference to FIG. 2 an operator may use winch 50 to apply an upward tension to foot 60. In one example draw bar 54 terminates such that brace bars 62 have clearance to rotate upwards (or downward as needed). Thus an operator will position foot 60 so there is sufficient clearance for dock 75 to be tilted upwards (or downwards) without contacting bar 54.

It may be appreciated that a dock may be stuck in position within the lake and given settlement of mud or rock, becomes extremely difficult to remove. Gradual tightening of winch 50 accommodates the extraction. It may also be appreciated that at an appropriate moment the vehicle itself may be moved to further assist in pulling of the dock or lift. Assembly 20 may be disassembled by removing the various pins and bolts for easy storage when not in use.

It may also be appreciated that assembly 20 may be used to insert a dock or other object into position. In such instance assembly 20 may be used to push a dock 75. In one instance, where drawbar 54 extends outward from mast 28 a distance greater than the distance extended by lift arm 38, drawbar 54 will be the primary lead or exert a primary force against dock 75. If pulley bar 42 were to extend outward and beyond a terminal end of draw bar 54, lift component 24 might otherwise experience the primary force upon dock 75. In such case the force may tend to cause lift component 24 to fail. Positioning the outward end of lift arm 38 slightly behind the terminal end of draw bar 54 accommodates an efficient use of assembly 20.

Although various descriptions, embodiments and examples have been presented, it will be appreciated by those skilled in the art that the invention may be embodied in many other forms. It will be apparent to one of ordinary skill in the art that changes or modifications can be made to the above-described devices and methods without departing from the spirit or scope of the invention as set forth herein.

What is claimed is:

1. A wheel-less pull and lift device for pulling and lifting an object, said device comprising:
a hitch receiver component configured to be secured within a standard tow hitch receiver of a vehicle;
a drawbar component configured to connect to said hitch receiver component at a first end of said drawbar component and to connect to an object to be pulled at an opposite second end of said draw bar component; and
a lift component including a lift arm configured to be positioned above said drawbar component where said drawbar component includes a drawbar, said drawbar having a lift foot positioned at said second end, said lift foot configured to swivel in relation to said drawbar, said device being wheel-less.

2. The device of claim 1 where said drawbar is a generally hollow rectangular tube configured to connect to a hitch ball at said first end.

3. The device of claim 1, said lift component connected to said hitch receiver component, said lift arm configured to be positioned over said drawbar component, said lift component including a winch having a line connecting to said second end of said drawbar component.

4. The device of claim 3 where the line is connected to a lift handle.

5. The device of claim 3 where said winch has a line connecting to said lift foot.

6. The device of claim 1 where said lift component includes a mast, said lift arm extending from said mast, a winch connected to said mast, a pulley in operation with said lift arm, and a cable extending from said winch to said pulley and downward and in connection with said drawbar component.

7. The device of claim 6 where said lift foot swivels in response to movement of said winch.

8. The device of claim 1 where said device is supported solely by connection to the hitch receiver.

9. The device of claim 1 where said lift foot pivots in relation to said drawbar.

10. The device of claim 1 where said drawbar component includes a lift foot pivotally connected to said drawbar at said opposite second end of said draw bar.

11. A device for lifting an object, said device comprising:
a drawbar component configured to connect to an object to be lifted; and
a lift component including a mast and a lift arm extending from said mast, said lift arm configured to be positioned above said drawbar component, and a winch having a line in association with said lift arm, the line in connection with said drawbar component, said drawbar component configured to simultaneously lift and pull the object upon operation of said winch where said drawbar component includes a lift foot which swivels in relation to a drawbar of said drawbar component, where said lift arm extends from said mast a first distance, said drawbar component includes a drawbar that connects to a hitch ball adjacent said mast, said drawbar extends from said hitch ball a second distance, said first distance being less than said second distance.

12. The device of claim 11 further comprising a hitch receiver component configured to insert into a hitch receiver of a vehicle.

13. A method for removing a dock from a water location, said method comprising:
providing a wheel-less assembly configured to operate with a receiver tube of a vehicle; and
utilizing the assembly to apply a pulling force to the dock to be removed while simultaneously applying a lifting force to the dock, said utilizing the assembly step includes operating a winch associated with the assembly where the assembly includes a drawbar having a lift foot, the lift foot adjusts in response to operation of the winch.

14. The method of claim 13 where the assembly includes a pulley associated with a lift arm, the winch includes a cable which passes the pulley and connects to the lift foot.

15. The method of claim 13 where the drawbar connects to a hitch ball of the assembly, the assembly including a lift arm extending from an end of a mast which connects to a hitch receiver component of the assembly, the lift arm extending rearward from the vehicle.

16. The method of claim 13 further comprising moving the vehicle in a direction opposite the dock.

17. The method of claim 13 where the lift foot pivots with respect to the draw bar.

18. The device of claim 13 where the drawbar is connected to a ball of a hitch at one end of the drawbar and the lift foot is connected at an opposite end of the drawbar.

19. A pull and lift device for pulling and lifting an object, said device comprising:
a hitch receiver component configured to be secured to a vehicle;
a drawbar component configured to connect to said hitch receiver component at a first end of said drawbar component and to connect to an object to be pulled at an opposite second end of said drawbar component; and
a lift component including a lift arm configured to be positioned above said drawbar component where said drawbar component includes a drawbar, said drawbar having a lift foot positioned at said second end, said lift foot configured to pivot in relation to said drawbar, said lift foot including a first lift bar and a second lift bar, said second lift bar configured to connect to said first lift bar.

* * * * *